(12) United States Patent
Shiraishi et al.

(10) Patent No.: US 9,701,184 B2
(45) Date of Patent: Jul. 11, 2017

(54) SUNSHADE DEVICE

(71) Applicant: AISIN SEIKI KABUSHIKI KAISHA, Kariya-shi, Aichi-ken (JP)

(72) Inventors: Tomohiro Shiraishi, Kariya (JP); Yoji Nagashima, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/069,018

(22) Filed: Mar. 14, 2016

(65) Prior Publication Data

US 2016/0280050 A1 Sep. 29, 2016

(30) Foreign Application Priority Data

Mar. 24, 2015 (JP) .................................. 2015-061192

(51) Int. Cl.
*B60J 3/02* (2006.01)
*B60J 7/02* (2006.01)
*B60J 7/00* (2006.01)

(52) U.S. Cl.
CPC .............. *B60J 7/02* (2013.01); *B60J 7/0007* (2013.01)

(58) Field of Classification Search
CPC ......... B60J 7/0007; B60J 7/003; B60J 7/0038
USPC .......... 296/214, 216.08; 160/370.21–370.23; 49/490; 312/334.44, 334.46
See application file for complete search history.

(56) References Cited

U.S. PATENT DOCUMENTS

| 4,946,225 A * | 8/1990 | Jardin ...................... B60J 7/022 248/188.2 |
| 8,727,431 B2 | 5/2014 | Nagashima et al. |
| 2002/0069588 A1* | 6/2002 | Finke .................. E05D 15/0652 49/409 |

FOREIGN PATENT DOCUMENTS

JP 2013-91358 5/2013

* cited by examiner

*Primary Examiner* — Dennis H Pedder
(74) *Attorney, Agent, or Firm* — Finnegan, Henderson, Farabow, Garrett & Dunner, LLP (57) ABSTRACT

A sunshade device includes guide rails slidably supporting a shade panel so as to open and close an opening formed on a vehicle roof; and a shade stopper attached to each guide rail, regulating an opening action by allowing the shade panel to abut on the shade stopper, wherein the guide rail includes a rail-side flange or flanges arranged side by side in a height direction which extend toward an inner side in a width direction, the shade stopper includes retaining pieces extending toward an outer side in the width direction and sandwiching the rail-side flange in the height direction, and rail-side and retaining-piece side engaging projections projecting in the height direction to face each other and regulating a movement of the retaining piece in the inner side in the width direction are respectively formed in the rail-side flange and the retaining piece in one side.

6 Claims, 5 Drawing Sheets

FIG.8

SUNSHADE DEVICE

CROSS REFERENCE TO RELATED APPLICATIONS

This application is based on and claims priority under 35 U.S.C. §119 to Japanese Patent Application 2015-061192, filed on Mar. 24, 2015, the entire contents of which are incorporated herein by reference.

TECHNICAL FIELD

This disclosure relates to a sunshade device including a shade stopper regulating an opening action of a shade panel in a full-open position.

BACKGROUND DISCUSSION

Various types of sunshade devices have been hitherto proposed. For example, in a structure of a sunshade device disclosed in JP 2013-91358A (Reference 1), when a shade panel slidably supported between an open position and a closed position by guide rails reaches the closed position, an end portion thereof abuts on a shade stopper provided in a housing, thereby regulating a further closing action.

On the other hand, a sunshade device having a shade stopper regulating the opening action of the shaped panel in the open position (full-open position) is also known. Specifically, a shade stopper is attached to a guide rail from an inner side of a vehicle in a width direction, and an end portion of the shade panel reaching the open position abuts on the shade stopper, thereby regulating a further opening action.

Incidentally, for example, when the end portion of the shape panel abuts on the shade stopper with a strong force, which is attached to the guide rail from the inner side of the vehicle in the width direction as described above, a component force in the width direction of the vehicle from which the shade stopper falls off may act on the shade stopper. Accordingly, it is required to suppress falling-off of the shade stopper from the guide rail.

SUMMARY

Thus, a need exists for a sunshade device which is not suspectable to the drawback mentioned above.

A sunshade device according to an aspect of this disclosure includes a pair of guide rails slidably supporting a shade panel so as to open and close an opening formed on a roof of a vehicle and a shade stopper attached to each of the guide rails, regulating an opening action by allowing an end portion of the shade panel to abut on the shade stopper when the shade panel is in an opening action state, in which the guide rail includes a rail-side flange or a pair of rail-side flanges arranged side by side in a height direction of the vehicle which extend toward an inner side of the vehicle in a width direction, the shade stopper includes a pair of retaining pieces extending toward an outer side of the vehicle in the width direction and sandwiching the rail-side flange in the height direction of the vehicle, and a rail-side engaging projection and a retaining-piece side engaging projection projecting in the height direction of the vehicle so as to face each other and regulating a movement of the retaining piece in the inner side of the vehicle in the width direction are respectively formed in the rail-side flange and the retaining piece in one side.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a sunshade device will be explained. A front and rear direction of a vehicle is referred to as a "front and rear direction", an upper direction and a lower direction in a height direction of the vehicle are respectively referred to as an "upper direction" and a "lower direction. An inner side in a vehicle width direction toward an inner direction of a vehicle interior is referred to as a "vehicle inner side" and an outer side in the vehicle width direction toward an outer direction of the vehicle interior is referred to as a "vehicle outer side".

Figure 1:
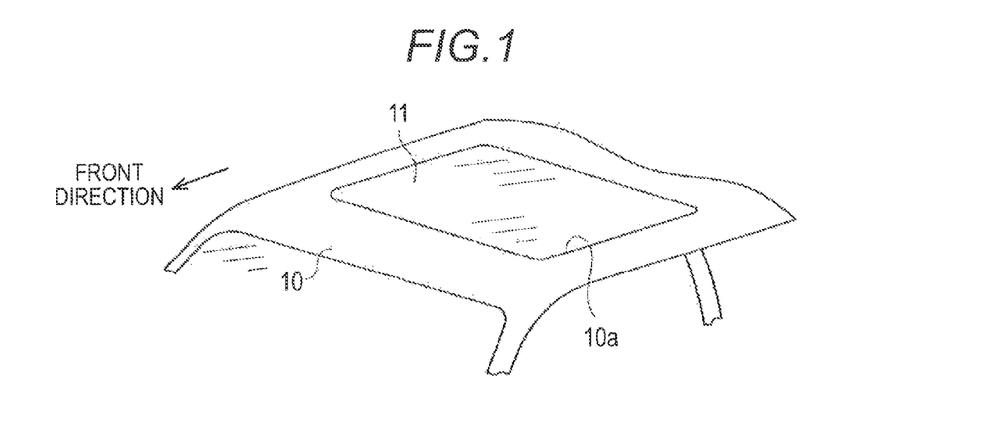
FIG. 1 is a perspective view showing a roof to which a sunshade device of an embodiment disclosed here is applied.

As shown in FIG. 1, in a roof 10 of a vehicle such as a motorcar, an opening 10a having an approximately square shape and a roof panel 11 made of glass or resin capable of opening and closing the opening 10a is provided.

Figure 2:
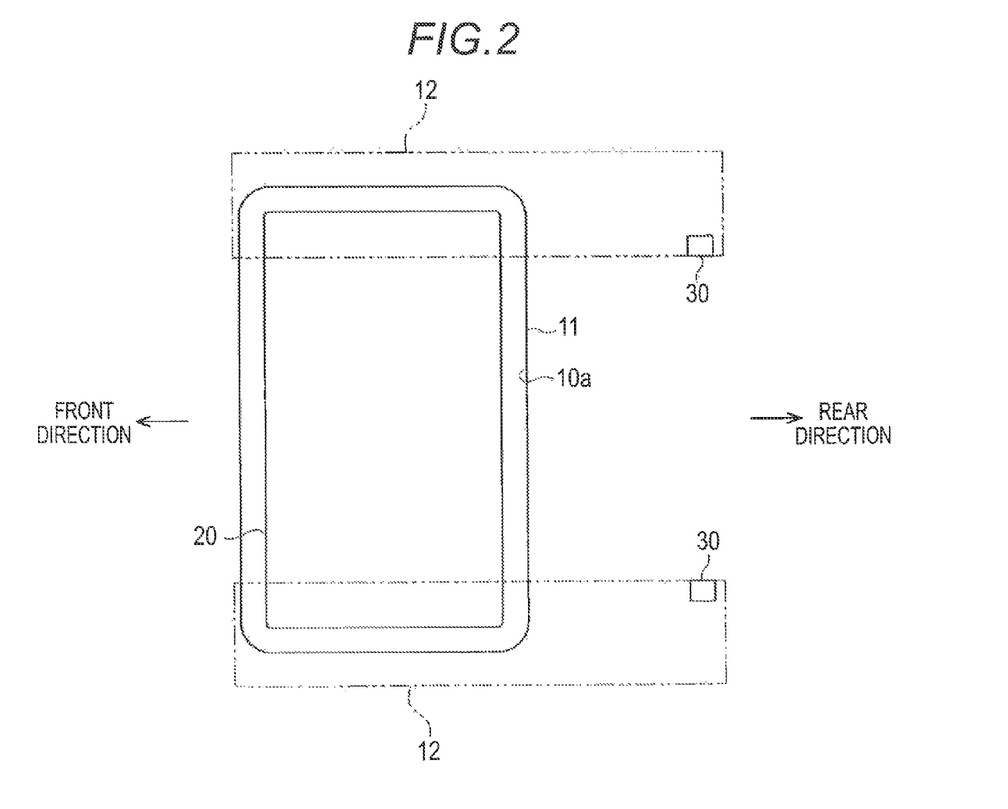
FIG. 2 is a plan view showing a structure of the sunshade device of the same embodiment.

As shown in FIG. 2, a pair of guide rails 12 made of, for example, an aluminum alloy extruded material are provided in the roof 10 so as to extend in the front and rear direction in both side edge portions of the opening 10a in the vehicle width direction. Both the guide rails 12 extend in the rear direction of the vehicle further from a rear end of the opening 10a. Both side edge portions in the vehicle width direction of a shade panel 20 formed of, for example, a resin plate material are supported in both guide rails 12 so as to be slide in the front and rear direction. The shade panel 20 cuts off light passing through the opening 10a (roof panel 11) when a front end of the shape panel 20 is positioned in a prescribed position (hereinafter also referred to as a "full-close position") which is the vicinity of front ends of the guiderails 12. On the other hand, the shade panel 20 allows light to pass through the opening 10a (roof panel 11) when a rear end of the shade panel 20 is positioned in a prescribed position (hereinafter also referred to as a "full-open position") which is the vicinity of read ends of the guide rails 12. Shade stoppers 30, for example, made of rubber are attached to rear end portions of the guide rails 12. The shade stoppers 30 abut on a rear end portion of the shade panel 20 when the shade panel 20 in an opening action state reaches the full-open position, thereby regulating the opening action in the full-open position.

Next, a structure of attaching the shade stopper 30 to the guide rail 12 will be explained.

Figure 3:
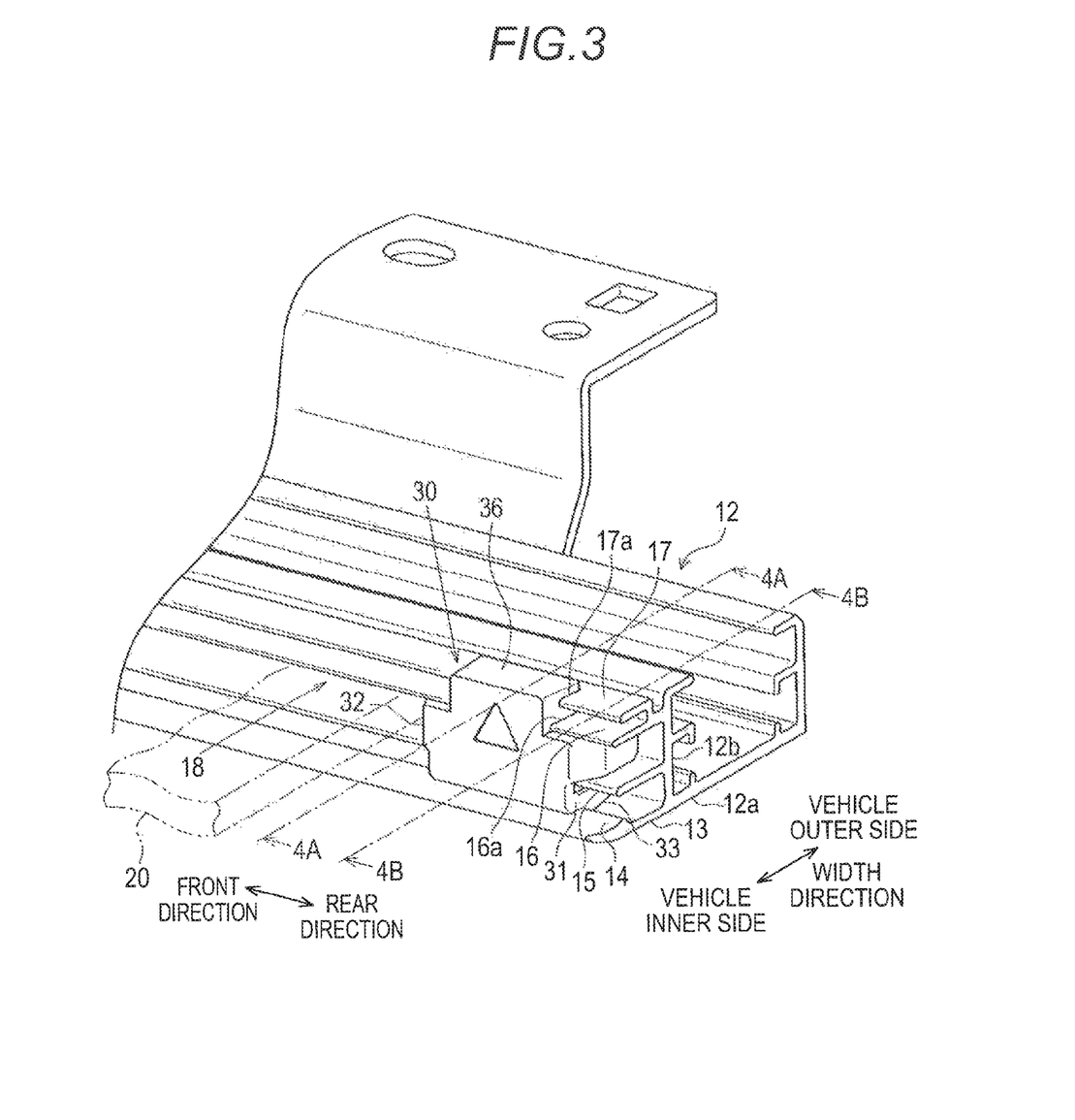
FIG. 3 is a perspective view showing a structure of the sunshade device of the same embodiment.
Figure 4A:
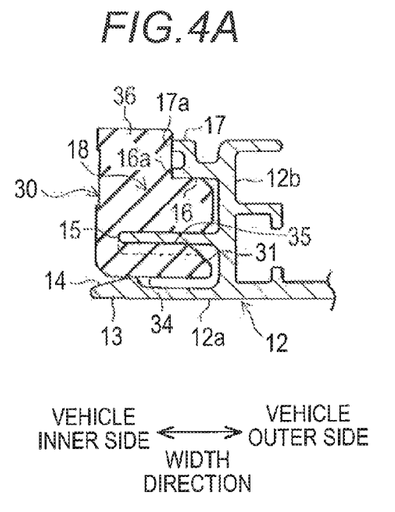
FIG. 4A and FIG. 4B are cross-sectional views taken along 4A-4A line and 4B-4B in FIG. 3.
Figure 4B:
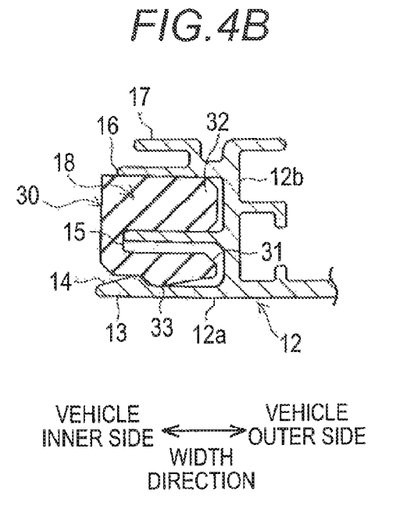
Figure 5:
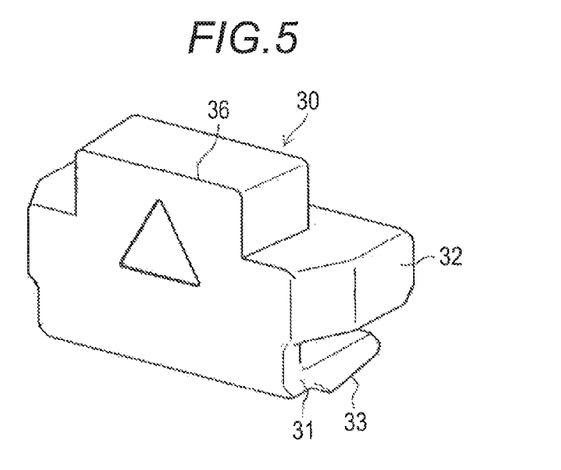
FIG. 5 is a perspective view showing a shade stopper.
Figure 6A:
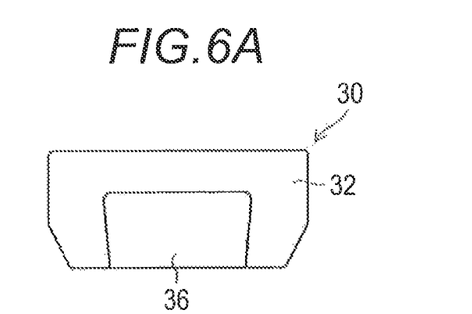
FIG. 6A to FIG. 6D show the shade stopper, which are a top view, a front view seen from an inner side of a vehicle in a width direction, a right side view and a back view.
Figure 6B:
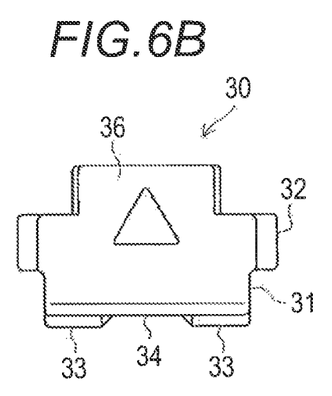
Figure 6C:
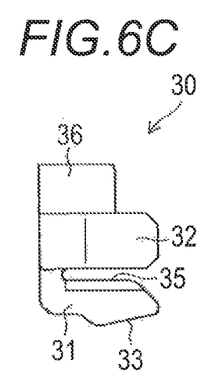
Figure 6D:
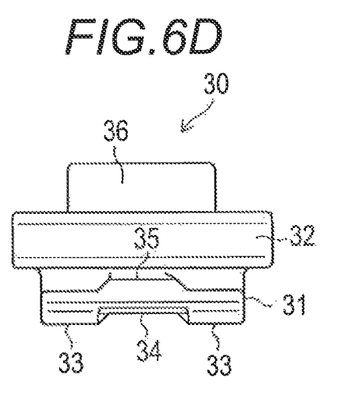

As shown in FIG. 3, FIG. 4A and 4B, the guide rail 12 has an approximately long bottom wall 12a extending in the front and rear direction (a direction orthogonal to the paper in FIG. 4) and a vertical wall 12b provided to stand upward from an end portion in a vehicle inner side of the bottom wall 12a. A portion of the bottom wall 12a in the vehicle inner side of the vertical wall 12b forms a rail-side lower flange 13 as a rail side flange and a second rail-side flange. In an end of the rail-side lower flange 13 in the vehicle inner side, a rail-side engaging projection 14 having an approximately triangle shape in cross section which projects upward is formed.

The guide rail 12 also includes a rail-side intermediate flange 15 as a rail-side flange and a first rail-side flange, and a rail-side upper flange 16 which extend in the vehicle inner side from the vertical wail 12b so as to be approximately parallel to the rail-side lower flange 13 with an interval in a height direction of the vehicle. The guide rail 12 further includes an upper wall 17 extending in the vehicle inner side upward from a base end portion of the rail-side upper flange 16. Moreover, cutouts 16a and 17a having an approximately rectangular shape opening to the vehicle inner side are formed in rear end portions of the rail-side upper flange 16 and the upper wall 17. These cutouts 16a and 17a are formed so that shapes projected in the vehicle height direction correspond to each other. A portion having a U-shape in cross section which opens in the vehicle inner side formed in cooperation of the vertical wall 12b, the rail-side intermediate flange 15 and the rail-side upper flange 16 forms a guide portion 18. Each side edge portion of the shade panel 20 in the vehicle width direction is supported by the guide portion 18 of the guide rail 12 so as to be slidable.

On the other hand, the shade stopper 30 includes a stopper-side flange 31 and a stopper body 32 having an approximately block shape as a pair of retaining pieces extending toward the vehicle outer side and sandwiching the rail-side intermediate flange 15 in the vehicle height direction. The stopper-side flange 31 and the stopper body 32 are connected in the vehicle height direction at an end of the vehicle inner side. A size of the stopper body 32 in the front and rear direction is set to be larger than an opening width of the cutout 16a and so on in the front and rear direction.

As shown in FIG. 5 and FIGS. 6A to 6D together, stopper-side engaging projections 33 as retaining piece-side engaging projections having an approximately triangle shape in cross section which project downward (a direction opposite to the rail-side engaging projection 14 in the vehicle height direction) at an front end portion and a rear end portion thereof are formed at an end of the stopper-side flange 31 in the vehicle outer side. In these stopper-side engaging projections 33, an engaging margin in the vehicle height direction is set with respect to the rail-side engaging projection 14. Therefore, a movement of the stopper-side flange 31 to the vehicle inner side is regulated by the stopper-side engaging projections 33 engaging with the rail-side engaging projection 14.

A given range of the stopper-side flange 31 in the front and rear direction sandwiched by both the stopper-side engaging projections 33 forms a thinning portion 34 where the stopper-side engaging projection 33 is not formed. The stopper-side flange 31 protrudes upward in an approximately table shape so as to correspond to the range of the thinning portion 34 in the front and rear direction, and an upper end surface thereof forms an abutting surface 35 closely contacting a lower surface of the rail-side intermediate flange 15 in the vehicle height direction. In other words, a clearance in the vehicle height direction is formed between the upper end surface of the stopper-side flange 31 and the lower surface of the rail-side intermediate flange 15 within a range between both the stopper-side engaging projections 33 in the front and rear direction.

The stopper body 32 is formed in a columnar state with an approximately table shape in which a size in the vehicle outer side in the front and rear direction is enlarged, which is sandwiched between the upper surface of the rail-side intermediate flange 15 and the lower surface of the rail-side upper flange 16 so as to closely contact each other. It goes without saying that the stopper body 32 is positioned in the guide portion 18.

The shade stopper 30 includes a fitting convex portion 36 having an approximately quadrangular prism shape projecting upward from an upper surface of the stopper body 32 close to the vehicle inner side. The fitting convex portion 36 is arranged in an intermediate part of the stopper body 32 in the front and rear direction, which protrudes upward so as to be higher than the upper wall 17 and is fitted to both the cutouts 16a and 17a. That is, the movement of the shade stopper 30 in the front and rear direction with respect to the guide rail 12 is regulated by the fitting convex portion 36 being fitted to both the cutouts 16a and 17a.

Figure 7:
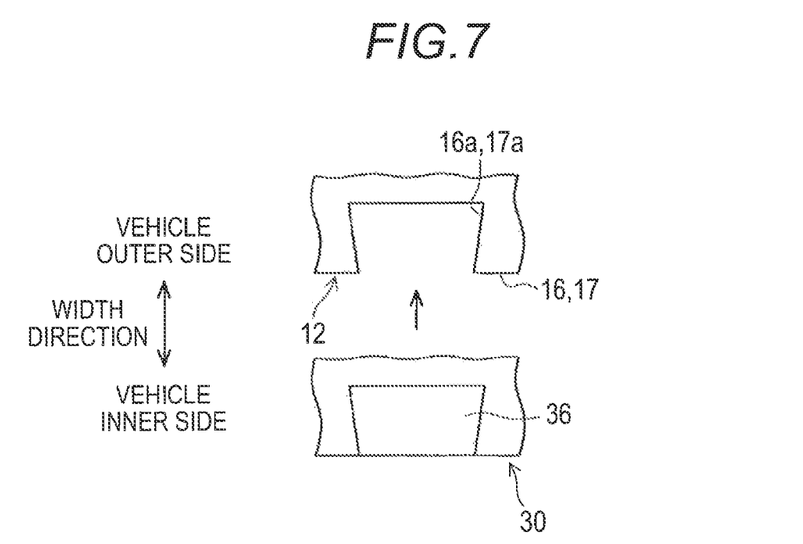
FIG. 7 is a plan view schematically showing an operation at the time of assembling the sunshade device of the same embodiment.

Here, as shown in FIG. 7 in an exaggerated manner, both the cutouts 16a and 17a are formed so that sizes (opening widths) in the front and rear direction are gradually increased toward the vehicle outer side, and the fitting convex portion 36 is also formed so that a size in the front and rear direction is gradually increased accordingly toward the vehicle outer side. Specifically, the fitting convex portion 36 and both the cutouts 16a and 17a are formed in an approximately isosceles trapezoid shape in which the width in the vehicle outer side is increased in plan view. Therefore, when the shade stopper 30 is attached to the guide rail 12 from the vehicle inner side, the fitting convex portion 36 is fitted to both the cutouts 16a and 17a while being elastically deformed so as to be reduced in size in the front and rear direction. In other words, the movement of the shade stopper 30 in the vehicle inner side is regulated by the fitting convex portion 36 being engaged with both the cutouts 16a and 17a with the gradual increase of the sizes of these portions in the front and rear direction.

Next, the operation of the embodiment will be explained.

As described above, the movement of the shade stopper 30 with respect to the guide rail 12 in the front and rear direction is regulated by the fitting convex portion 36 fitted to both the cutouts 16a and 17a. Accordingly, in the shade panel 20 in an opening action state, the movement, namely, the opening action is regulated by the rear end portion thereof abutting on the shade stopper 30 (stopper body 32) with the movement in the rear direction of the vehicle.

There may be a case where a load of moving the shade stopper 30 to the vehicle inner side is generated as in a case where the rear end portion of the shade panel 20 strongly abuts on the shade stopper 30 so that a moment of a force acts thereon, for example, when the shade panel 20 is strongly opened. In this case, the movement of the stopper-side flange 31 to the vehicle inner side is regulated by the rail-side engaging projection 14 and the stopper-side engaging projections 33, thereby suppressing falling-off of the shade stopper 30 from the guide rail 12.

As described above, the following advantages can be obtained according to the embodiment.

(1) In the embodiment, the movement of the stopper-side flange 31 to the vehicle inner side is regulated by the rail-side engaging projection 14 and the stopper-side engaging projections 33, thereby suppressing failing-off of the shade stopper 30 from the guide rail 12.

(2) In the embodiment, the cut-outs 16a and 17a opening to the vehicle inner side are formed in the guide rail 12 (the rail-side upper flange 16 and the upper wall 17), and the shade stopper 30 includes the fitting convex portion 36 fitted to the cutouts 16a and 17a to regulate the movement in the front and rear direction with respect to the guide rail 12. The sizes of the cutouts 16a, 17a and the fitting convex portion 36 in the front and rear direction are gradually increased toward the vehicle outer side. Accordingly, the movement of the shade stopper 30 in the vehicle inner side can be regulated by the cutouts 16a and 17a being engaged with the fitting convex portion 36 with the gradual increase of the sizes of these portions in the front and rear direction, which can further suppress falling-off of the shade stopper 30 from the guide rail 12.

The structure for regulating the movement of the shade stopper 30 in the front and rear direction with respect to the guide rail 12, that is, the structure for regulating the opening action of the shade panel 20 in the full-open position is used, thereby suppressing failing-off of the shade stopper 30 without uselessly complicating the shape of the shade stopper 30 and so on.

(3) In the embodiment, the abutting surface 35 of the stopper-side flange 31 closely contacts the rail-side intermediate flange 15 in the vehicle height direction, therefore, the shade stopper 30 is capable of being positioned in that direction.

(4) In the embodiment, the stopper-side flange 31 has the thinning portion 34 where the stopper-side engaging projection 33 is not formed in the given range in the front and rear direction. Therefore, when the stopper-side flange 31 is inserted between the rail-side intermediate flange 15 and the rail-side lower flange 13 from the vehicle inner side to attach the shade stopper 30 to the guide rail 12, it is not necessary to get over the rail-side engaging projection 14 in the thinning portion 34. As it is not necessary for the stopper-side flange 31 to get over the rail-side engaging projection 14 over the entire range in the front and rear direction thereof as described above, assembling performance of the shade stopper 30 can be improved.

(5) In the embodiment, the abutting surface 35 of the stopper-side flange 31 is arranged no as to correspond to a given range in the front and rear direction where the thinning portion 34 is arranged. Therefore, when the stopper-side flange 31 is inserted between the rail-side intermediate flange 15 and the rail-side lower flange 13 from the vehicle inner side to attach the shade stopper 30 to the guide rail 12, the abutting surface 35 closely contacts the rail-side intermediate flange 15 in the vehicle height direction, however, it is not necessary to get over the rail-side engaging projection 14. Accordingly, it is possible to position the shade stopper 30 in the vehicle height direction without impairing assembling performance of the shade stopper 30.

(6) As the shade stopper 30 is made of rubber in the embodiment, the stopper-side engaging projections 33 get over the rail-side lower flange 13 or the fitting convex portion 36 is inserted into the cutouts 16a and 17a while being elastically deformed when assembling the shade stopper 30 to the guide rail 12 from the vehicle inner side. Accordingly, it is possible to further improve assembling performance of the shape stopper 30 with respect to the guide rail 12. At the time of the opening action of the shade panel 20, it is possible to absorb the shock of abutting (collision) at the rear end portion thereof.

(7) In the embodiment, it is possible for the shade stopper 30 to regulate the shade panel 20 so as not to slip off in the rear direction of the vehicle beyond the full-open position, for example, when the shade panel 20 is strongly opened or a large static load is added, In particular, the shade stopper 30 provided separately from the guide rail 12 is adopted, therefore, it is not necessary to form a cut-and-raised portion functioning in the same manner as the guide rail 12, which can improve workability of the guide rail 12.

(8) In the embodiment, the movement of the shade stopper 30 in the front and rear direction is regulated by the cutouts 16a and 17a which can be easily formed in the guide rail 12, therefore, the workability of the guide rail 12 is not impaired.

The above embodiment may be modified as follows.

Figure 8:
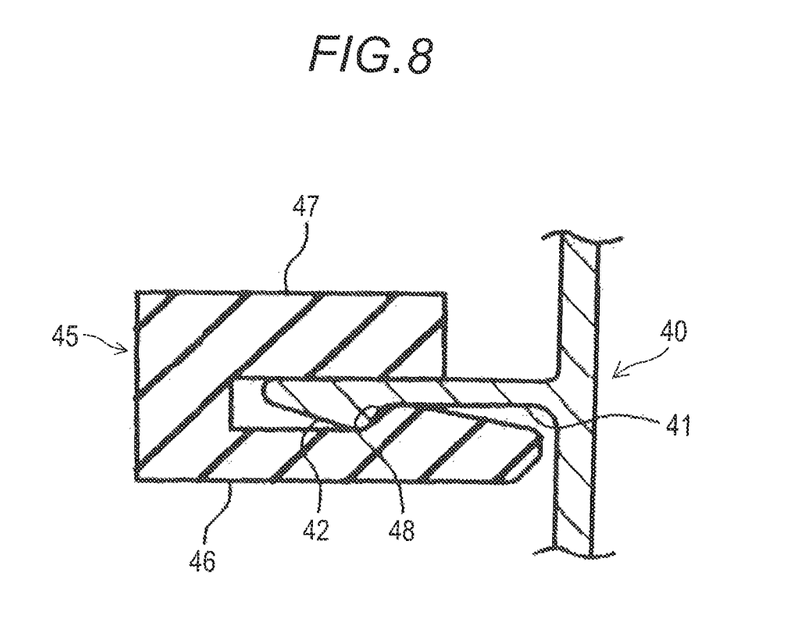
FIG. 8 is a cross-sectional view showing a sunshade device of a modification of this disclosure.

A guide rail 40 in which one rail-side flange 41 extends toward the vehicle inner side as shown in FIG. 8 may be adopted. In this case, a shade stopper 45 attached to the guide rail 40 has a pair of retaining pieces 46 and 47 extending toward the vehicle outer side and sandwiching the rail-side flange 41 in the vehicle height direction. In the rail-side flange 41 and the retaining piece 46 in one side, a rail-side engaging projection 42 and a retaining-piece side engaging projection 48 projecting in the vehicle height direction so as to face each other and regulating the movement of the retaining piece 46 in the vehicle inner side are respectively formed. Therefore, even when the above modification is made, the movement of the retaining piece 46 in one side to the vehicle inner side is regulated by the rail-side engaging projection 42 and the retaining-piece side engaging projection 48, thereby suppressing falling-off of the shade stopper 45 from the guide rail 40. It is also possible that a rail-side engaging projection and a retaining-piece side engaging projection projecting in the vehicle height direction so as to face each other and regulating the movement of the retaining piece 47 to the vehicle inner side are respectively formed in the rail-side flange 41 and the retaining piece 47 instead of forming the rail-side engaging projection 42 and the retaining-piece side engaging projection 48.

In the embodiment, the abutting surface 35 may be arranged so as to be longer or shorter in the front and rear direction than the given range in which the thinning portion 34 is arranged.

In the embodiment, a thinning portion arranged in at least one of a front end portion and a rear end portion of the stopper-side flange 31 may be adopted instead of the thinning portion 34. It is also preferable to arrange thinning portions in ranges of plural positions in the front and rear direction of the stopper-side flange 31. In either case, it is preferable that the abutting surface 35 is arranged so as to alternate with the stopper-side engaging projections 33 in accordance with the given range in which the thinning portion is arranged in the front and rear direction.

The thinning portion 34 may be omitted in the embodiment. That is, a stopper-side engaging projection formed over the almost entire length of the stopper-side flange 31 in the front and rear direction may be adopted.

In the embodiment, the abutting surface 35 may be omitted as long as an engaging margin in the vehicle height direction in which the movement of the stopper-side flange 31 in the vehicle inner side can be regulated is secured between the rail-side engaging projection 14 and the stopper-side engaging projections 33. That is, an upper surface of the stopper-side flange 31 may be extend flatly, for example, in the front and rear direction so that a clearance in the vehicle height direction is formed with respect to the lower surface of the rail-side intermediated flange 15.

In the embodiment, sizes of the front and rear direction of the fitting convex portion 36, the cutouts 16a and 17a may be fixed. That is, the fitting convex portion 36, the cutouts 16a and 17a may be formed to have, for example, an approximately rectangular shape in plan view.

In the embodiment, the structure for regulating the movement of the shade stopper 30 in the front and rear direction with respect to the guide rail 12 is an example. It is also preferable that, for example, a cutout opening to the vehicle inner side is formed in the rail-side lower flange 13 and a fitting convex portion fitted to the cutout is provided to project at part of the stopper-side flange 31 in the front and rear direction. It is further preferable that a cutout opening to the vehicle inner side is formed in the rail-side intermediate flange 15 and a fitting convex portion fitted to the cutout is provided to project at part of the stopper-side flange 31 or the stopper body 32 in the front and rear direction. Furthermore, it is preferable that the cutout 17a of the upper wall 17 is omitted and a fitting convex portion fitted only to the cutout 16a is provided to project in the stopper body 32. These fitting convex portion and the cutouts may be combined with each other. In any case, the convex portion and the cutouts are preferably formed so that sizes thereof in the front and rear direction are gradually increased toward the vehicle outer side.

In the embodiment, the roof panel 11 may be a movable slide panel as well as a fixed panel.

A sunshade device according to an aspect of this disclosure includes a pair of guide rails slidably supporting a shade panel so as to open and close an opening formed on a roof of a vehicle and a shade stopper attached to each of the guide rails, regulating an opening action by allowing an end portion of the shade panel to abut on the shade stopper when the shade panel is in an opening action state, in which the guide rail includes a rail-side flange or a pair of rail-side flanges arranged side by side in a height direction of the vehicle which extend toward an inner side of the vehicle in a width direction, the shade stopper includes a pair of retaining pieces extending toward an outer side of the vehicle in the width direction and sandwiching the rail-side flange in the height direction of the vehicle, and a rail-side engaging projection and a retaining-piece side engaging projection projecting in the height direction of the vehicle so as to face each other and regulating a movement of the retaining piece in the inner side of the vehicle in the width direction are respectively formed in the rail-side flange and the retaining piece in one side.

According to this configuration, the movement of the retaining piece in one side to the inner side of the vehicle in the width direction is regulated by the rail-side engaging projection and the retaining-side engaging projection, thereby suppressing falling-off of the shade stopper from the guide rail.

In the sunshade device according to the aspect of this disclosure, it is preferable that cutouts opening to the inner side of the vehicle in the width direction are formed in the guide rail, the shade stopper includes a fitting concave portion fitted to the cutouts to regulate the movement in a front and rear direction of the vehicle with respect to the guide rail, and the fitting concave portion and the cutouts are formed so that sizes in the front and rear direction are gradually increased toward the outer side of the vehicle in the width direction.

According to this configuration, the fitting concave portion is engaged with the cutouts with the gradual increase of the sizes of these portions in the front and rear direction of the vehicle, thereby regulating the movement of the shade stopper to the inner side of the vehicle in the width direction and further suppressing falling-off of the shade stopper from the guide rail.

In the sunshade device according to the aspect of this disclosure, it is preferable that the guide rail includes the rail-side flanges in a pair, a first rail-side flange as the rail-side flange in one side is not provided with the rail-side engaging projection and is sandwiched between the retaining pieces, a second rail-side flange as the rail-side flange in the other side is provided with the rail-side engaging projection, sandwiching the retaining piece in one side provided with the retaining-piece side engaging projection together with the first rail-side flange in the height direction of the vehicle, and the retaining piece in one side has an abutting surface closely contacting the first rail-side flange in the height direction of the vehicle.

According to this configuration, the abutting surface of the retaining piece in one side closely contacts the first rail-side flange in the height direction of the vehicle, thereby positioning the shade stopper in that direction.

In the sunshade device according to the aspect of this disclosure, it is preferable that the retaining piece in one side has a thinning portion in which the retaining-piece side engaging projection is not formed in a given range in the front and rear direction of the vehicle.

According to this configuration, when the retaining piece in one side is inserted between the first rail-side flange and the second rail-side flange from the inner side of the vehicle in the width direction to attach the shade stopper to the guide rail, it is not necessary to get over the rail-side engaging projection in the thinning portion. As it is not necessary for the retaining piece in one side to get over the rail-side engaging projection over the entire range of the front and rear direction of the vehicle, the assembling performance of the shade stopper can be further improved.

In the sunshade device according to the aspect of this disclosure, it is preferable that the abutting surface is arranged so as to correspond to the given range in which the thinning portion is arranged.

According to this configuration, when the retaining piece in one side is inserted between the first rail-side flange and the second rail-side flange from the inner side of the vehicle in the width direction to attach the shade stopper to the guide rail, it is not necessary get over the rail-side engaging projection though the abutting surface closely contacts the first rail-side flange in the height direction of the vehicle. Accordingly, it is possible to position the shade stopper in the height direction of the vehicle without impairing assembling performance of the shade stopper.

These aspects of this disclosure have an advantage that falling-off of the shade stopper from the guide rail is capable of being suppressed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunshade device comprising:
a pair of guide rails slidably supporting a shade panel so as to open and close an opening formed on a roof of a vehicle; and
a shade stopper attached to each of the guide rails, regulating an opening action by allowing an end portion of the shade panel to abut on the shade stopper when the shade panel is in an opening action state,
wherein the guide rail includes a pair of rail-side flanges arranged side by side in a height direction of the vehicle which extend toward an inner side of the vehicle in a width direction,
the shade stopper includes a pair of retaining pieces extending toward an outer side of the vehicle in the width direction and sandwiching one of the rail-side flanges in the height direction of the vehicle, and
a rail-side engaging projection and a retaining-piece side engaging projection projecting in the height direction of the vehicle so as to face each other and regulating a movement of the retaining piece in the inner side of the vehicle in the width direction are respectively formed in the rail-side flange and one of the retaining pieces, wherein
cutouts opening to the inner side of the vehicle in the width direction are formed in the guide rail,
the shade stopper includes a fitting concave portion fitted to the cutouts to regulate the movement in a front and rear direction of the vehicle with respect to the guide rail, and
the fitting concave portion and the cutouts are formed so that sizes in the front and rear direction are gradually increased toward the outer side of the vehicle in the width direction.

2. The sunshade device according to claim 1,
wherein a first rail-side flange as the one of the pair of rail-side flanges is sandwiched between the retaining pieces,
a second rail-side flange as the other of the pair of rail-side flanges is provided with the rail-side engaging projection, sandwiching the one of the retaining pieces provided with the retaining-piece side engaging projection together with the first rail-side flange in the height direction of the vehicle, and
the one of the retaining pieces has an abutting surface closely contacting the first rail-side flange in the height direction of the vehicle.

3. The sunshade device according to claim 2,
wherein the one of the retaining pieces has a thinning portion in which the retaining-piece side engaging projection is not formed in a given range in the front and rear direction of the vehicle.

4. The sunshade device according to claim 3,
wherein the abutting surface is arranged so as to correspond to the given range in which the thinning portion is arranged.

5. The sunshade device according to claim 1,
wherein the one of the retaining pieces has a thinning portion in which the retaining-piece side engaging projection is not formed in a given range in the front and rear direction of the vehicle.

6. The sunshade device according to claim 2,
wherein the first rail-side flange is not provided with the rail-side engaging projection and is sandwiched between the retaining pieces.

* * * * *